US011922236B2

United States Patent
Young et al.

(10) Patent No.: US 11,922,236 B2
(45) Date of Patent: Mar. 5, 2024

(54) PRODUCER-SIDE PRIORITIZATION OF MESSAGE PROCESSING

(71) Applicant: Open Text GXS ULC, Halifax (CA)

(72) Inventors: Garrett Christopher Young, Wylie, TX (US); Timothy Austin Geldart, Grapevine, TX (US)

(73) Assignee: OPEN TEXT GXS ULC, Halifax (CA)

( * ) Notice: Subject to any disclaimer, the term of this patent is extended or adjusted under 35 U.S.C. 154(b) by 0 days.

(21) Appl. No.: 17/666,476

(22) Filed: Feb. 7, 2022

(65) Prior Publication Data

US 2022/0156131 A1 May 19, 2022

Related U.S. Application Data

(63) Continuation of application No. 16/861,004, filed on Apr. 28, 2020, now Pat. No. 11,263,066, which is a continuation of application No. 15/956,556, filed on Apr. 18, 2018, now Pat. No. 10,642,668.

(51) Int. Cl.
*G06F 9/54* (2006.01)
*H04L 41/08* (2022.01)
*H04L 51/06* (2022.01)
*H04L 51/226* (2022.01)

(52) U.S. Cl.
CPC ............. *G06F 9/546* (2013.01); *H04L 41/08* (2013.01); *H04L 51/06* (2013.01); *H04L 51/226* (2022.05)

(58) Field of Classification Search
CPC ............. H04L 41/0806; H04L 41/0893; H04L 51/066; H04L 51/26; G06F 9/546
See application file for complete search history.

(56) References Cited

U.S. PATENT DOCUMENTS

| | | | | |
|---|---|---|---|---|
| 2002/0129264 A1* | 9/2002 | Rowland | ............... | H04L 63/102 709/224 |
| 2005/0044552 A1* | 2/2005 | Bliss | ............... | G06F 9/451 719/312 |
| 2007/0088792 A1* | 4/2007 | Piper | ............... | G06F 9/546 709/207 |
| 2007/0253412 A1* | 11/2007 | Batteram | ............... | H04L 65/1104 370/389 |

(Continued)

OTHER PUBLICATIONS

Office Action for U.S. Appl. No. 17/337,266, dated Jan. 13, 2023, 13 pgs.

(Continued)

*Primary Examiner* — Tuan C Dao
(74) *Attorney, Agent, or Firm* — Sprinkle IP Law Group

(57) ABSTRACT

Systems, methods, and computer program products for producer-side prioritization of message processing. Producer-side prioritization of message processing may include receiving an input message according to a messaging protocol for communicating between software components, where the input message comprises message priority information for the input message, producing a command for a next step in the processing flow, the command including a target time determined using the message priority information from the input message, queuing the command in a command queue, selecting the command from the command queue based on a determination that the target time has expired, and processing the command.

20 Claims, 9 Drawing Sheets

(56) References Cited

U.S. PATENT DOCUMENTS

| | | | | |
|---|---|---|---|---|
| 2009/0064153 | A1* | 3/2009 | Ishimura | G06F 9/5011 |
| | | | | 712/E9.034 |
| 2009/0210876 | A1* | 8/2009 | Shen | G06F 9/505 |
| | | | | 718/100 |
| 2010/0313208 | A1* | 12/2010 | Zarzycki | G06F 9/52 |
| | | | | 719/315 |
| 2013/0179418 | A1* | 7/2013 | Wang | G06F 16/24578 |
| | | | | 707/706 |
| 2013/0238383 | A1 | 9/2013 | Licari | |
| 2014/0359113 | A1 | 12/2014 | Krebs | |
| 2015/0019041 | A1* | 1/2015 | Chandler | A61L 9/035 |
| | | | | 700/306 |
| 2015/0278323 | A1 | 10/2015 | Melahn | |
| 2016/0117195 | A1 | 4/2016 | Wang | |
| 2016/0182357 | A1* | 6/2016 | Martinsen | H04L 47/17 |
| | | | | 370/396 |
| 2017/0097939 | A1* | 4/2017 | Zhu | G06F 16/9535 |
| 2017/0286186 | A1* | 10/2017 | Kagan | G06F 9/524 |
| 2018/0288077 | A1 | 10/2018 | Siddiqui | |
| 2018/0302487 | A1 | 10/2018 | Burns | |
| 2020/0012602 | A1 | 1/2020 | Zhao | |

OTHER PUBLICATIONS

Office Action for U.S. Appl. No. 17/337,266, dated Jun. 28, 2023, 13 pgs.

Notice of Allowance for U.S. Appl. No. 17/337,266, dated Oct. 27, 2023, 2 pgs.

* cited by examiner

700

| | |
|---|---|
| REQUEST CONSUMER FREQUENCY POLL QUEUE EVERY | |
| THROTTLE MESSAGES | X |
| MAX REQUESTS | 30 |
| PRODUCER MAX TARGET TIME DELTA | 600 |
| PRODUCER TARGET TIME GRANULARITY | 1 MILLISECOND ▼ |
| CONSUMER SELECTION ORDER | TARGET TIME ONLY ▼ |
| CONSUMER DEMAND MULTIPLIER | 10X |

(INDICATES THE THREADPOOL SIZE MULTIPLIER FOR COMMAND SELECTION PREFETCH)

| | |
|---|---|
| ENABLE COMMAND THROTTLING | X |
| MAXIMUM CONCURRENT THREADS | |
| THROTTLING DELAY | |

THROTTLED PROCESSES

[X] JOB SERVER 1   [X] JOB SERVER 2   [ ] JOB SERVER 3

( SUBMIT )

FIG. 7

| CURRENT PRIORITIZATION | |
|---|---|
| PRIORITY | delta_time |
| 9 | 0 ▼ Seconds |
| 8 | 0 ▼ Seconds |
| 7 | 5 ▼ Seconds |
| 6 | 5 ▼ Seconds |
| 5 | 5 ▼ Seconds |
| 4 | 10 ▼ Seconds |
| 3 | 10 ▼ Seconds |
| 2 | 10 ▼ Seconds |
| 1 | 10 ▼ Seconds |
| 0 | 10 ▼ Seconds |

| PRIORITIZATION TEMPLATE | GEOMETRIC ▼ | ADD REMOVE APPLY |
|---|---|---|
| PRIORITY | TARGET TIME delta_time | |
| 9 | 0 ▼ Seconds | |
| 8 | 1 ▼ Seconds | |
| 7 | 2 ▼ Seconds | |
| 6 | 4 ▼ Seconds | |
| 5 | 8 ▼ Seconds | |
| 4 | 16 ▼ Seconds | |
| 3 | 32 ▼ Seconds | |
| 2 | 64 ▼ Seconds | |
| 1 | 128 ▼ Seconds | |
| 0 | 256 ▼ Seconds | |

FIG. 8

PRODUCER-SIDE PRIORITIZATION OF MESSAGE PROCESSING

RELATED APPLICATIONS

This application is a continuation of and claims the benefit of priority under 35 U.S.C. § 120 to U.S. patent application Ser. No. 16/861,004 filed Apr. 28, 2020, entitled "Producer-Side Prioritization of Message Processing," issued as U.S. Pat. No. 11,263,066, which is a continuation of and claims the benefit of priority under 35 U.S.C. § 120 to U.S. patent application Ser. No. 15/956,556 filed Apr. 18, 2018, entitled "Producer-Side Prioritization of Message Processing," issued as U.S. Pat. No. 10,642,668, which is hereby fully incorporated by reference herein for all purposes.

TECHNICAL FIELD

This disclosure relates generally to systems and methods for processing messages between software components. More particularly, this disclosure relates to systems and methods for producer-side prioritization of message processing in a processing flow.

BACKGROUND

Message-oriented Middleware (MOM) provides an infrastructure that supports messaging between application components, including application components distributed over heterogeneous platforms. MOM is increasingly being deployed in the context of cloud computing—that is, in "the cloud"— where computing resources are delivered as services over one or more networks (e.g., the Internet).

Messaging can enable distributed communication between loosely coupled components. According to some message-based protocols, a component sends a message to a destination (e.g., a queue), and the recipient retrieves the message from the destination. However, the sender and the receiver do not have to be available at the same time in order to communicate, nor, in some cases, know anything about each other. The sender and the receiver need to know only what message format and destination to use. The messaging thus may be asynchronous, such that once a message has been sent, the sender can continue to do other work without waiting for a response. In other implementations, the messaging may be synchronous.

The message-based protocols supported by MOM often use simple, highly flexible message formats, allowing messages to encapsulate a variety of data used by distributed components. This simplicity can lead to various implementation problems, particularly at scale. For example, Java Message Service (JMS), which is a popular MOM API for sending messages between message producers and message consumers, defines a message format having a limited amount of header data and a minimally defined body format such that JMS messages can transport a wide variety of data with relatively little overhead. The simple priority scheme supported by JMS, however, does not scale well to systems that process a large number of messages or to multi-tenant systems in which different service level objectives apply to different tenants.

The JMS message header includes a priority field (JMSPriority) so that a message producer can set a message priority for a message when placing the message in a message queue. The message priority can only be set to 0-9 by the message producer (if no priority is set, JMS defaults to 4). To facilitate processing based on priority, a JMS message consumer may implement a message selector to select messages from a message queue having a particular priority range. The JMS prioritization scheme can be considered "consumer-based" because it is the consumers that control when messages are processed from the queue.

The JMS priority levels are relative priorities. For example, level 9 messages in a queue will have priority over level 8 messages regardless of how long the level 8 messages have been in the queue. Additionally, the JMS consumer cannot select from the JMS message queue based on age because the JMS message selector provides no guarantee of ordering. The use of relative priorities and lack of ordering can lead to a situation in which a glut of higher priority messages cause lower priority messages to languish in the message queue. This can result in a component failing to meet service level objectives with respect to the lower priority messages, even if the application could have waited to process some of the higher priority messages until later while still meeting the service level objectives for the higher priority messages.

One solution to the problems discussed above is to run multiple JMS consumers, each implementing a selector for a particular limited range of priorities. This solution, however, can result in idle threads—that is, wasted processing resources—when there are no messages in the message queue in the priority ranges for particular consumers. On the other hand, if there are many messages in the queue in the priority range for a small number of consumers, the limited number of threads allocated to process the messages in the priority range can lead to a processing bottleneck, starving downstream processes of tasks.

SUMMARY

Embodiments described herein provide systems and methods for producer-side priority processing. Producer-side priority processing can be used to control the timing of processing steps in a multi-step processing flow.

One embodiment includes an apparatus for producer-side prioritization of processing in a computer system. The apparatus comprises a processor. The apparatus further comprises a set of computer instructions stored on a computer readable medium, the set of computer instructions executable by the processor to cause the processor to provide a message processing system that provides a processing flow. The message processing system comprises an input message consumer, a command queue, a command producer, and a command consumer. The message processing system may further comprise an output message producer configured to produce output messages corresponding to the input messages. The command producer and command consumer may be between the message consumer and message producer in the processing flow.

The input message consumer is configured to consume input messages from an input message queue. The command producer is configured to apply a function to the priority information to determine target times for commands corresponding to the input messages and produce commands for a next step in the processing flow. Each command comprises a target time determined using priority information extracted from an input message to which that command corresponds. The command may further include the priority information extracted from the input message to which the command corresponds. The command producer can be further configured to queue the commands in the command queue.

According to one embodiment, the command producer is configured to determine, for each of the commands, a time delta associated with the priority information extracted from the message corresponding to the command and add the time delta associated with the priority information extracted from the message corresponding to that command to a current time to determine the target time to include in that command. The command producer may be configured to determine the time delta to be added to the current time to produce the target time for the command using a lookup table that associates time deltas with priority information.

The command consumer is configured to select commands that have expired target times from the command queue for processing by the next step in the processing flow and consume the selected commands from the command queue. The command consumer may be configured to identify candidate commands that have expired target times from the command queue, order the candidate commands based on an ordering rule and select the commands that have expired target times for processing according to the order. According to one embodiment, the candidate commands may be ordered based on target time or priority. The command consumer may also be configured to limit a number of commands selected from the command queue at a time (e.g., per scan of the command queue by the command consumer) based on demand. The command consumer may be further configured to pass priority information extracted from the selected commands to a next producer in the processing flow.

Another embodiment includes a method for producer-side prioritization of processing. The method comprises receiving, at a message processing system, input messages that comprise priority information. The method further includes producing, by a command producer of the message processing system, commands for a next step in the processing flow, the commands corresponding to the input messages. Each command comprises a target time determined using priority information extracted from an input message to which that command corresponds. Each command may further include the priority information extracted from the input message to which the command corresponds. The commands produced by the command producer are queued in a command queue of the message processing system.

Producing the commands may thus comprise applying a function to the priority information from the input messages to determine target times for commands corresponding to the input messages. For example, producing the commands may comprise, determining, for each of the commands, a time delta associated with the priority information extracted from the message corresponding to the command and adding the time delta associated with the priority information extracted from the message corresponding to the command to a current time to determine the target time to include in that command. Determining the time delta associated with the priority information extracted from a message corresponding to a command may comprise performing a lookup in a lookup table that associates priority information with time deltas.

The method may further include a command consumer of the message processing system identifying commands in the command queue that have expired target times, selecting the identified commands for processing by the next step in processing flow and consuming the selected commands from the command queue. The method may further include the command consumer passing the priority information extracted from a command to a next producer.

According to one embodiment, identifying the commands in the command queue that have expired target times comprises identifying candidate commands from the command queue that have expired target times. Selecting the identified commands for processing may further comprise ordering the candidate commands based on an ordering rule; and selecting the commands that have expired target times for processing according to the order. According to one embodiment, candidate commands may be ordered based on target time or priority.

The method may further comprise producing output messages of the message processing system by a message producer. The command producer and the command consumer may be located between an input message consumer and the output message producer in the processing flow.

Embodiments described herein provide technical advantages over prior consumer-side priority processing. First, the producer can have knowledge of a message, service level objective (SLO) and system state when determining target time, allowing the producer to make informed determination of how long message processing should be delayed at the next step of a processing flow.

Embodiments described herein provide further technical advantages over prior consumer-side priority processing by converting relative priorities to absolute urgency for the next processing step. This reduces or eliminates the likelihood that a low priority message will not remain in queue indefinitely as higher priority messages are continually processed instead.

Embodiments described herein provide another advantage by allowing dynamic adjustment of a target time for each processing step.

As another advantage, consumer implementation is less complex and thus consumers can be more easily scaled without retuning.

As yet another advantage, embodiments reduce or eliminate starvation.

As yet another advantage, the configuration of the message processing system can be easily changed to allow for throttling.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7 is a diagrammatic representation of one embodiment of an operator interface for configuring a message processing system.

FIG. 8 is a diagrammatic representation of another embodiment of an operator interface for providing prioritization data.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Embodiments described herein provide systems and methods for producer-side prioritization of processing. Producer-side prioritization of processing can be used to control the timing of processing steps in a processing flow.

Figure 1:
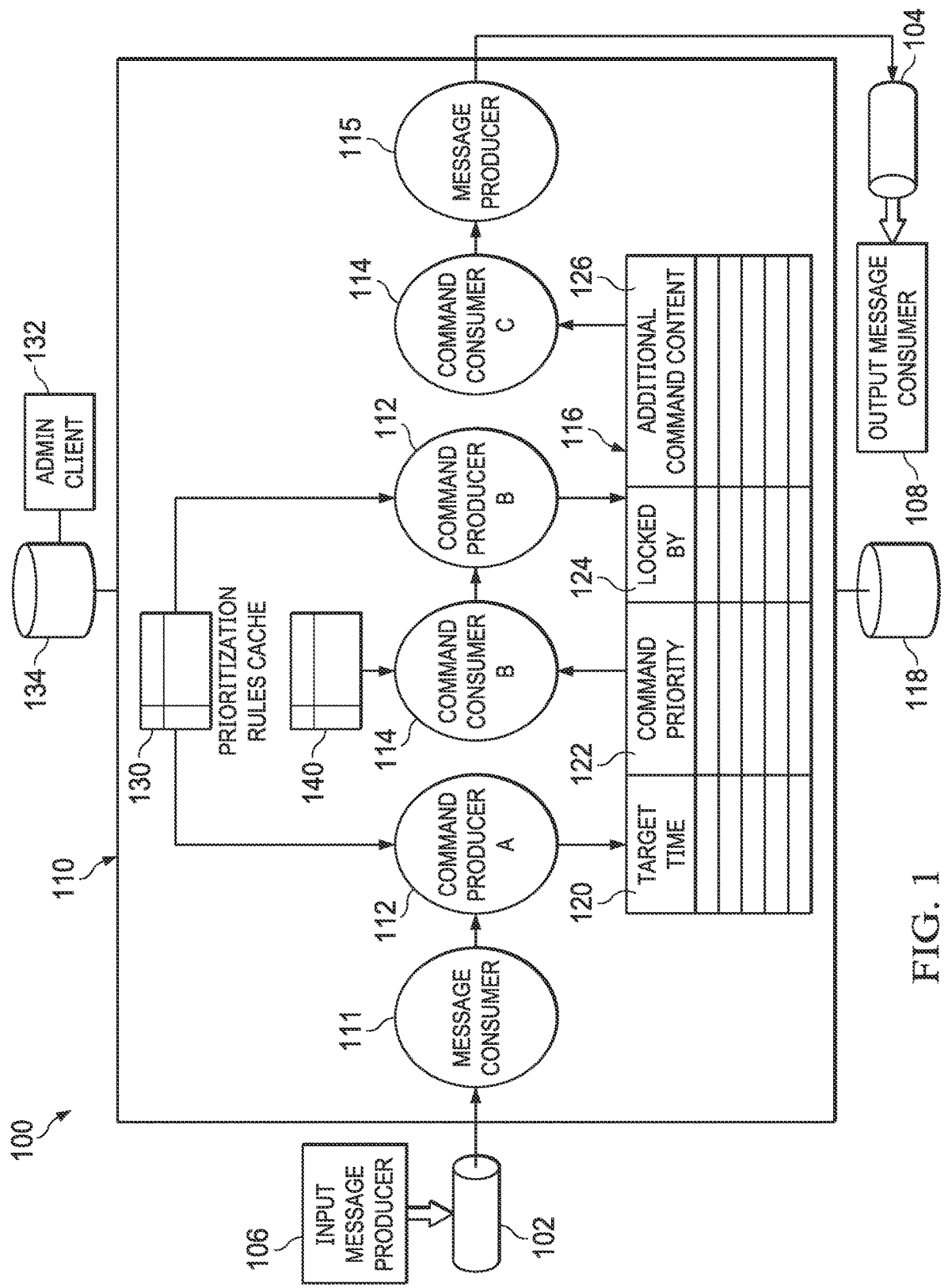
FIG. 1 is a diagrammatic representation of one embodiment of an application system that includes a message processing system.

FIG. 1 is a block diagram illustrating one embodiment of an application system 100 comprising a plurality of applications, processes or threads. Applications, processes or threads may be distributed, for example, in a cloud computing environment.

Application system 100 comprises a message processing system 110 coupled to an input message queue 102 and an output message queue 104. Message processing system 110 implements a multi-step processing flow to process input messages (e.g., requests) to generate results. Results may include output messages (e.g., responses) or job processing results. Processing an input message may include processing a number of commands corresponding to the input message. In this context, a command may be said to correspond to an input message if the command was produced by message processing system 110 as part of the processing flow of processing that input message to generate a result.

Input message queue 102 and output message queue 104 are staging areas that contain messages waiting to be read by message consumers. Input message queue 102 and output message queue 104 may reside in volatile memory, persistent storage or a combination thereof. According to one embodiment, input message queue 102 and output message queue 104 are persisted in a database.

Input message producer 106 is an application, process or thread within a process that produces input messages for consumption by message processing system 110. Output message consumer 108 is an application, process or thread within a process that consumes output messages produced by message processing system 110. In some embodiments, input message producer 104 and output message consumer 106 are portions of the same application, process or thread.

The input messages may be requests for processing system 110 to process jobs. For example, in an application system 100 configured to translate documents from one electronic format to another, an input message may include information relevant to translating a document, such as the location of the document, the type of translation or other data. In any event, each input message can include priority information that is used by message processing system 110 to prioritize processing based on the input messages. The priority information can include information in the message metadata (e.g., message header) or message payload (e.g., message body). Using the example of a JMS input message, one embodiment of the priority information may include the priority indicated in the priority field of the JMS message header (e.g., 0-9). In addition or in the alternative the body of the message may include priority information. In some implementations, the body of a JMS message may include a service level objective (SLO) for processing the message expressed as a time-to-complete (e.g., three minutes to respond to the input message with the results of a job). The priority information may then include the SLO information.

As discussed above, message processing system 110 implements a multi-step processing flow to process input messages and generate corresponding results. In the embodiment of FIG. 1, the multi-step processing flow has steps A, B and C, with each step comprising at least one producer or consumer. In the embodiment illustrated, message processing system 110 includes input message consumer 111, command producers 112 (e.g., Command Producer A, Command Producer B), command consumers 114 (e.g., Command Consumer B, Command Consumer C) and output message producer 115. Input message consumer 111, command producers 112, command consumers 114 and output message producer 115 can be applications, processes or threads. According to one embodiment, input message consumer 111, output message producer 115, command producers 112 and command consumers 114 can each be implemented as objects.

A single application, process or thread in a process may act as both a consumer and producer. Preferably, however, each producer 112 is a separate application, process or thread from subsequent consumers 114 in the processing flow. A producer, for example, may be a thread of a first process while subsequent consumers are separate threads of the same process or threads of at least one additional process. Producers and consumers in a processing flow may be distributed, for example, in a cloud computing environment.

In general, command producers 112 output commands to queue 116 for consumption by a subsequent step in the processing flow. A command contains a target time to control when the command will be processed by a subsequent step in the flow. The command may also include data so that a subsequent producer can generate a new target time. Subsequent command consumers 114 consume commands from command queue 116 based on the target times associated with the commands and other selection criteria. A consumer can pass data to a subsequent producer using data queues or other techniques. For example, if Command Consumer B is a first thread in a process and Command Producer B is a second thread in the process, Command Consumer B may write data to a shared queue, such as the queue of a thread pool manager of the process. The data passed to the subsequent producer can include data to be used by the producer to generate a new target time. Through the use of the target times, the message processing system 110 can control the timing of processing messages.

Input message consumer 111 is an application, process or thread configured to consume input messages from input message queue 102. According to one embodiment, input message consumer 111 comprises a JMS selector configured to scan input message queue 102 and select messages based on selection criteria including, but not limited to, the priority level 0-9 indicated in the JMSPriority field of the messages. Input message consumer 111 may be configured to further obtain data from other sources, process data from the input messages or other sources and pass data, including the message priority information, to the subsequent command producer 112 (e.g., Command Producer A).

A command producer 112 is an application, process or thread configured to process data from a consumer and produce commands that correspond to input messages. Command producers 112 may be configured to further obtain data from other sources, process data from a message consumer or command consumer or data received from other sources. Command producers 112 produce commands to command queue 116, which is a staging area holding commands waiting to be read by command consumers 114. Command queue 116 may reside in volatile memory, persistent storage (e.g., a database or other data store 118) or a combination thereof.

A command is a request for processing by a next step in the processing flow and may be a message formatted according to a format that is known by command consumers 114. A command can include command metadata and a command body. In the embodiment illustrated, each command includes fields for a target time 120, command priority information 122, a locked status 124 and additional command content 126. The target time 120 of a command indicates an earliest time that the next command consumer 114 should pick up the command from queue 116. In other words, the target time controls the delay in processing of the command by the next processing step in the processing flow. The command priority information 122 in a command corresponding to an input message includes priority information to be used by the next command producer 112 to generate a target time for a command corresponding to the input message. The command priority information 122 for a command may include the message priority information from the corresponding input message. Lock status 124 indicates that a consumer 114 has picked up the command from queue 116 and may identify the consumer. The command may have a null or other lock status when initially enqueued to indicate that the command has not yet been picked up by a command consumer 114.

Additional command content 126 can include other data (e.g., metadata or command body) used by subsequent command consumers, producers or other components as part of the processing flow to generate a result for a message. The additional command content 126 for a command is dependent on the application system in which embodiments are implemented and may comprise one or more portions of the corresponding input message, data obtained by processing system 110 or data produced by the processing system 110. The additional command content 126 for a command may include data used by a downstream consumer 114 to identify a command to select from command queue 116.

As part of producing a command, a command producer 112 applies a prioritization rule to the priority information from the message or a prior command to convert the priority information to a target time 120 for the command being produced and includes the target time 120 and priority information 122 as part of the command. According to one embodiment, the command producers 112 access prioritization rules data from a prioritization rules cache 130 to apply the prioritization rule. Prioritization rules cache 130 may reside in volatile memory, persistent memory or a combination thereof.

The prioritization rules data may specify a function on priority information or provide values (e.g., variable values, coefficient values or other values) used when applying a prioritization rule. A prioritization rule may comprise any function to convert the priority information to a time value, for example, an absolute time value. The prioritization rule may be for example, a function on the priority information or other data, e.g., target_time=f(priority), target_time=f(priority, current_time), target_time=f(priority, current_time, time-to-complete, system-state, history . . . ). The target_time may be calculated to a level of granularity that reduces the likelihood that multiple commands in queue 116 will have the same target time. For example, target time may be calculated to the millisecond. According to one embodiment, some or all of command producers 112 apply the same prioritization function, but each producer can recalculate the target time for the next processing step.

Figures 2, 3A:
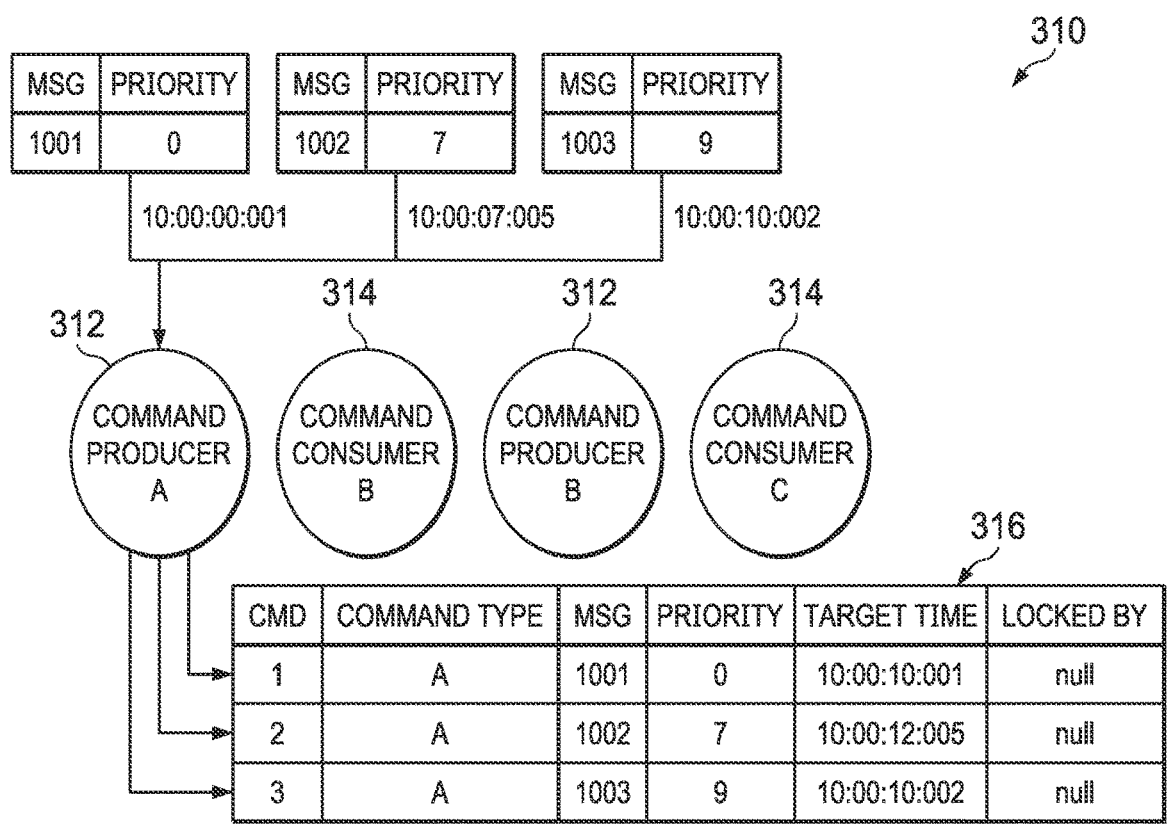
FIG. 2 illustrates an example set of prioritization data.
FIG. 3A is a diagrammatic representation of one embodiment of a message processing system at a first time.

As one example, the prioritization rule may be the function target_time=current_time+delta_time, where delta_time is determined from a lookup based on priority level. For further context, FIG. 2 is a table 200 illustrating an example of a lookup table holding delta_time values. Using the example of table 200, a command producer 112, when producing a command, can use priority information to look up a delta time in table 200 and add the returned delta_time to the current time. The command producer 112, in this example, will assign a target time of current_time+10 seconds to a command corresponding to a message having a JMSPriority field value of 4, but assign a target time equal to the current_time to a command corresponding to a message having a JMSPriority filed value of 9.

If the input messages contain a time-to-complete (e.g., an SLO), the prioritization function may be target_time=current_time+delta_time where delta time is based on a lookup by SLO and priority level. In another embodiment, the prioritization function may determine how long the producer can delay processing of the next step in a flow and still meet the time-to-complete; for example, target_time=current_time+SLO/x. 'x' may be a value based on historical performance of the processing system 110, current resource utilization or a combination thereof.

In another embodiment, a lookup of a delta_time value may be based on a variety of data, where the delta_time values are determined for a combination of data based on machine learning. As another example, the prioritization rules data may contain a machine learning model comprising a reference set of feature vectors, each reference feature vector representing a class having an associated delta_time value. A command producer 112 may be configured to determine an input feature vector from data corresponding to a message and compare the input feature vector to the reference set of feature vectors representing the known classes to determine the reference feature vector that has the highest similarity to the input feature vector. The delta_time value associated with the reference feature vector having the highest similarity to the input feature vector may be added to the current time to determine the target time for the command.

Each command consumer 114 is an application, process or thread within a process configured to select commands from command queue 116 for processing. Command consumers 114 may further process data from commands, data obtained by the command consumers or data produced by the command consumers. Command consumers 114 can pass data, including priority information, to subsequent producers.

Each command consumer 114 comprises a command selector configured to select commands from command queue 116. According to one embodiment, command consumer 114 scans queue 116 to identify candidate commands that have target times that have expired and are not locked. A command target time may be considered expired based on rules. For example, a command consumer 114 may watch for commands that have a current time that is less than the current time, or the command consumer 114 may watch for commands that have a current time that is less than or equal to the current time.

The command consumer 114 further identifies consumable commands from the candidate commands based on selection criteria, such as command type or other data matching the selection criteria of the command consumer 114 (e.g., in additional command content 136 of the command). For example, Command Consumer A may identify commands that meet a first set of selection criteria as command consumable by Command Consumer A and Command Consumer B identify commands that meet a second set of selection criteria as commands consumable by Command Consumer B, where the first set of selection criteria and second set of selection criteria are different.

The command consumer 114 may apply an ordering rule to order consumable commands based on one more ordering criteria. For example, a command consumer can order candidate commands based on target time, priority, target time first and then priority, priority first then target time.

A command consumer 114 selects commands from the identified consumable commands to consume. The command consumer can select the commands in order according to the ordering. In one embodiment, a command consumer 114 selects and locks all of the identified consumable commands for processing by that command consumer 114. In another embodiment, a command consumer 114 may apply one or more selection rules to determine how many commands to select from queue 116 for consumption. As one example, a command consumer feeding data to a thread pool may access consumer configuration information 140 that specifies how many threads are in the thread pool and apply a demand function (e.g., demand=f(threadpool_activity)) to determine the number of consumable commands to consume based on the configuration information, e.g., based on the number of downstream threads available. According to one embodiment, for example, demand=m*threadpool_size, where "m" is a multiplier set in the configuration information.

Output message producer 115 is an application, process or thread within a process that produces output messages to output message queue 104. The output messages, according to one embodiment, may be responses to the input messages. The output messages may indicate, for example, results of requested jobs.

System 100 further comprises an admin component 132 that provides an interface (e.g., web-based interface, command line interface or other interface) to allow a user at a client computer to configure prioritization rules, selection criteria and other aspects of processing system 110. Configuration data can be stored in a configuration database or other configuration data store 134. At least some of the configuration data may be pushed to cache. For example, prioritization rules data, such as a prioritization function definition, can be stored in a prioritization rules cache 130 for access by command producers 112. Similarly, consumer configuration data 140, such as a demand function, can be stored in a consumer configuration cache for use by consumers.

While only one instance of the consumers and producers for each of Step A, Step B and Step C are illustrated in FIG. 1, a message processing system 110 may include multiple instances of each step with the instances configured differently. For example, message processing system 110 may include multiple processes or threads with a message consumer 111 and Command Producer A. In such an embodiment, a first process or thread may be configured to watch queue 102 for input messages having a first priority range (e.g., input messages having a JMSPriority field value of 8-9) and output corresponding commands to queue 116, a second process or thread may be configured to watch queue 102 for input messages having a second priority range (e.g., input messages having a JMSPriority field value of 5-7) and output corresponding commands to queue 116 and a third process or thread may configured to watch queue 102 for input messages having a third priority range (e.g., input messages having a JMS priority field value of 0-4) and output commands to queue 116. Further, there may be multiple instances of Step B having a Command Consumer B and Command Producer B. In such an embodiment, for example, a first Step B process or thread may be configured to select commands for a first type of processing (e.g., a first type of translation) from queue 116 and produce corresponding commands to queue 116, a second Step B process or thread may be configured to select commands for a second type of processing (e.g., a second type of translation) from queue 116 and produce corresponding commands to queue 116, and so on. Further, there may be multiple instances of Step C having a Command Consumer C and output message producer.

In operation, message consumer 111 selects an input message from a message queue and passes data corresponding to the message—that is data from the message or data obtained or produced by message consumer 111 based on the message—to Command Producer A. The data corresponding to the input message may include the priority information from the input message, such as the JMSPriority field value, a time to complete or other data from the message that is used by a command producer 112 to determine a target time for a command corresponding to the message.

Command Producer A produces a first command corresponding to the message. The command may include data corresponding to the message, including data corresponding to the message received from message consumer 111 or data obtained or produced by Command Producer A based on the data corresponding to the message received from message consumer 111. In producing the command, Command Producer A determines a target time 120 for the command and sends the command to command queue 116. The command includes the target time 120 determined for the command, command priority information 122, which may be the same as the message priority information for the corresponding message, a lock status 124 and additional command content 126.

Command Consumer B scans command queue 116 to identify candidate commands that have expired target times and are not locked. Command Consumer B selects commands from the identified commands to consume. Command Consumer B may order commands based on target time or priority for selection. Command Consumer B may limit the number of commands selected at a time based on consumer configuration information 140.

Command Consumer B passes data corresponding to an input message to Command Producer B. The data corresponding to the input message may include data corresponding to the input message received in a selected command or data obtained or produced by Command Consumer B based on data corresponding to the message from the command. The data corresponding to the message passed to Command Producer B may include priority information from a selected command, which may in turn be the priority information from the corresponding input message.

Command Producer B produces a second command corresponding to the message. The command may include data corresponding to the message, including data corresponding to the message received from Command Consumer B or data obtained or produced by Command Producer B based on the data corresponding to the message received from Command Consumer B. In producing the command, Command Producer B determines a target time 120 for the second command and sends the command to command queue 116. The second command includes the target time 120 determined for the command, command priority information 122, which may be the same as the message priority information for the corresponding message, a lock status 124 and additional command content 126.

Command Consumer C watches command queue 116 to identify candidate commands that have expired target times and are not locked. Command Consumer C selects commands from the candidate commands to consume. Command Consumer C may order commands based on target time or priority for selection. Command Consumer C may limit the number of commands selected at a time based on available resources downstream of Command Consumer C, e.g., based on demand for data from Command Consumer C.

Command Consumer C passes data corresponding to an input message to output message producer 115. The data corresponding to the input message may include data corresponding to the input message received in a selected command or data obtained or produced by Command Consumer C based on data corresponding to the message from the command. The data corresponding to the message may include priority information from a selected command.

Output message producer 115 produces an output message corresponding to an input message. The output message may include data corresponding to the input message received from Command Consumer C or data obtained or produced by output message producer 115 based on data corresponding to the input message received from Command Consumer C. Output message producer 115 can output the output message to output message queue 104. The output message may contain, for example, the results or location of the results of a processing job requested in a corresponding input message.

Message processing system 110 may be said to implement producer-side prioritization of processing because it is the command producers that primarily control when a next processing step will process a command or message. Producer-side prioritization of processing provides a number of advantages. First, each producer 112 can have knowledge of a message priority, SLO and system state when determining target time, allowing the producer to make informed determination of how long message processing should be delayed at the next step of a processing flow.

Embodiments described herein provide further technical advantages over prior consumer-side priority processing by converting relative priorities to absolute urgency for the next processing step. This reduces or eliminates the likelihood that processing corresponding to a low priority message will be delayed indefinitely as higher priority messages are continually processed instead.

Embodiments described herein provide another advantage by allowing dynamic adjustment of a target time for each processing step. For example, each producer 112 can recalculate the target time for commands used to implement processing of a message.

As another advantage, consumer selectors are less complex and thus consumers can be more easily scaled without retuning.

As yet another advantage, each consumer can process commands that meet that consumer's selection criteria regardless of the relative priority specified in the input message. Thus, it is less likely that a consumer will remain idle. Furthermore, a consumer may limit how many commands it selects based on downstream processing resources. Thus, a consumer is less likely to lock commands that cannot be processed until further resources come available. As such, one consumer is less likely to starve other consumers of commands.

Figure 3B:
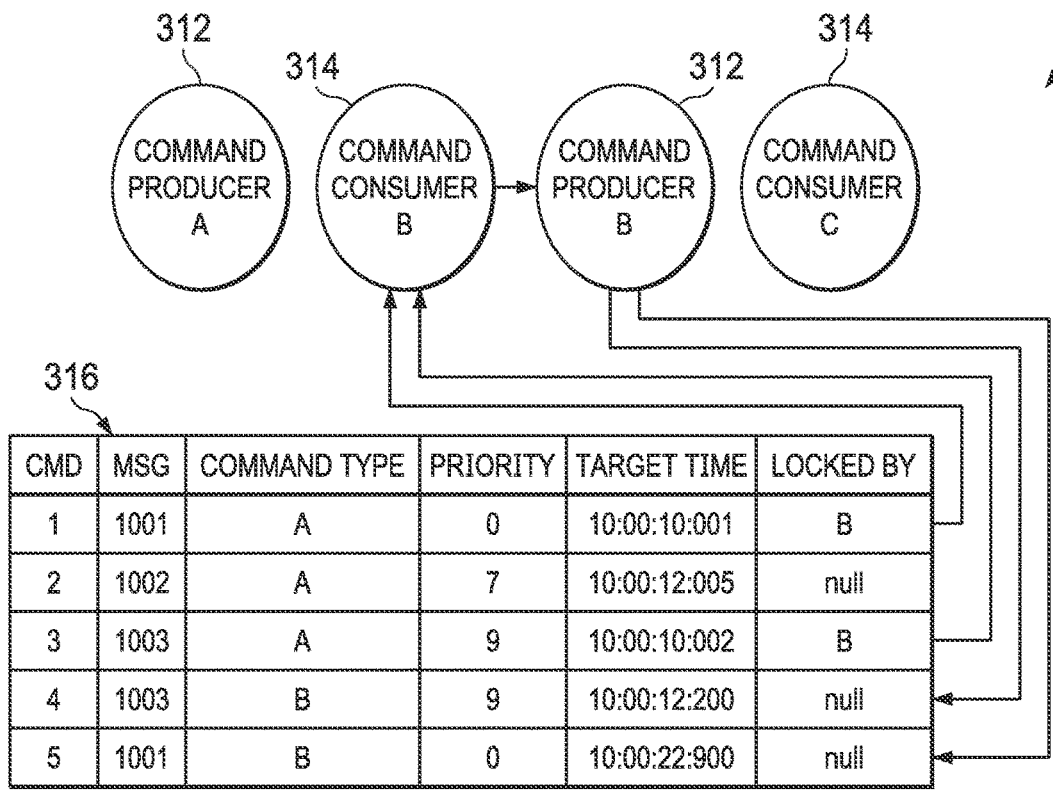
FIG. 3B is a diagrammatic representation of one embodiment of a message processing system at a second time.
Figure 3C:
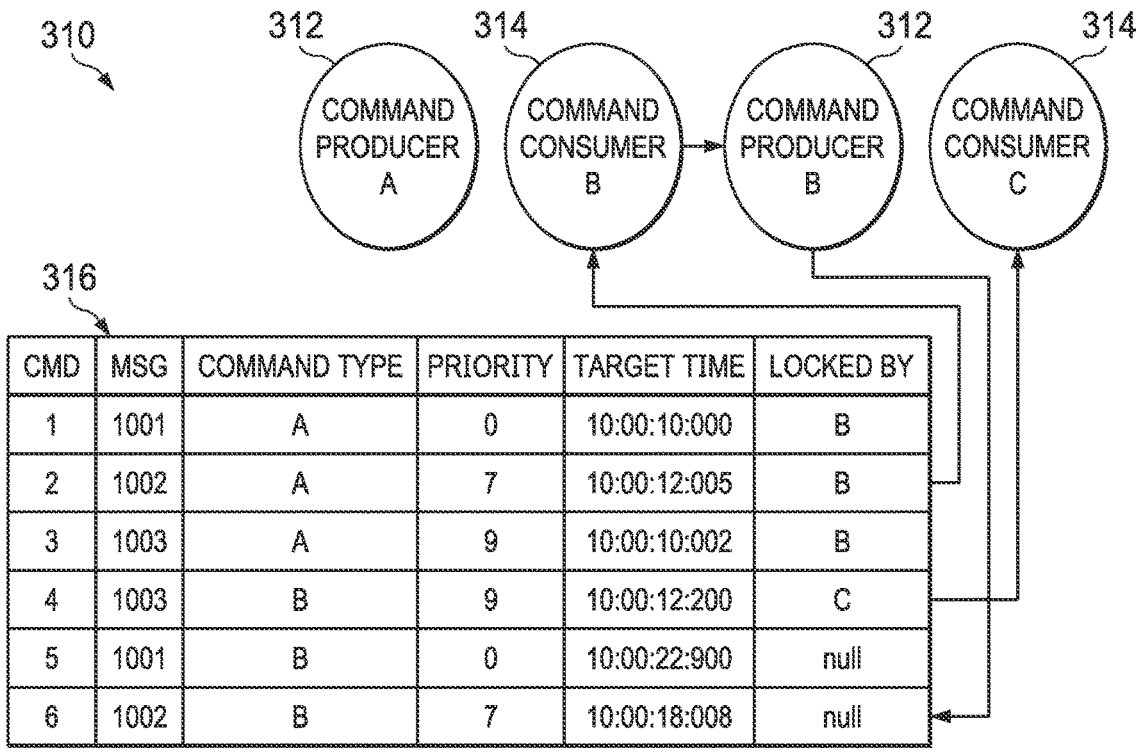
FIG. 3C is a diagrammatic representation of one embodiment of a message processing system at a third time.

FIGS. 3A, 3B and 3C are diagrammatic representations of one embodiment of a processing flow for processing input messages. Message processing system 310 comprises command producers 312 (e.g., Command Producer A, Command Producer B) and command consumers 314 (e.g., Command Consumer B, Command Consumer C). Command producers 312 and command consumers 314 may be examples of command producers 112 and command consumers 114, respectively.

Command producers 312 send commands to command queue 316, which may be an example of command queue 116. Commands in command queue 316 include a target time, a lock status and additional command content. For convenience, the commands further include a command id and identify the messages to which they correspond. For the sake of example, command producers 312 apply the function target_time=current_time+delta_time to determine target times for commands, where table 200 of FIG. 2 is used to determine delta_time. Further, it is assumed that Command Producer A produces commands of type A, Command Producer B produces commands of type B, Command Consumer B is configured to consume commands of type A and Command Consumer C is configured to consume commands of type B.

In the example of FIG. 3A, Command Producer A receives data corresponding to input messages having message ids 1001, 1002, 1003 and priorities of 0, 7 and 9 (e.g., JMSPriority field values) respectively and processes the messages at 10:00:00:001, 10:00:07:005, 10:00:10:002 respectively to produce command 1 corresponding to message 1001, command 2 corresponding to message 1002 and command 3 corresponding to message 1003.

Turning to FIG. 3B, at 10:00:12:00, Command Consumer B and Command Consumer C scan queue 316 to identify candidate commands that are not locked and have expired target times. Command Consumer B and Command Consumer C, for example, time order the candidate commands and apply selection criteria to identify consumable commands. In the example of FIG. 3B, Command Consumer B identifies commands 1 and 3 as candidate commands and as consumable commands, locks the commands and consumes them for processing in order. Command Consumer C does not identify any consumable commands as there are no commands of type B in queue 316 at this point.

Command Consumer B selects the consumable commands based on the ordering. In this example, Command Consumer B selects and processes command 3 first and passes data corresponding to messages 1003 to Command Producer B and then processes command 1 and passes data corresponding to message 1001 to Command Producer B. The data corresponding to messages 1003 and 1001 can include priority information from those messages, respectively. Command 2 is not identified as a candidate command because the target time for command 2 is not yet expired.

Command Producer B processes the data from Command Consumer B corresponding to message 1003 at 10:00:12:200 and processes the data from Command Consumer B corresponding to message 1001 at 10:00:12:900 to produce commands 4 and 5 having command type B. It can be noted that, in this example, Command Producer B applies the same prioritization rule (e.g., the same prioritization function) as Command Producer A.

Turning to FIG. 3C, at 10:00:13:00, Command Consumer B and Command Consumer C scan queue 316 to identify candidate commands that have expired target times and are not locked. In this example, the candidate commands are commands 2 and 4 (FIG. 3B). Command Consumer B identifies command 2 as a consumable command (e.g., based on command type A), locks the command and consumes the command for processing. Command Consumer B processes command 2 and passes data corresponding to messages 1002 to Command Producer B. Command Producer B processes the data from Command Consumer B corresponding to message 1002 at 10:00:13:08 to produce command 6.

Command Consumer C identifies command 4 as a consumable command, locks command 4 and consumes command 4 for processing. Command Consumer C passes data corresponding to message 1001 to a subsequent process or thread.

This process may continue through a series of producers and consumers. It can be noted that, while the lower priority message (MSG1001) gets processed more slowly than a higher priority message, the lower priority message will eventually take priority over higher priority message at a processing step of the processing flow when a target time has been exceeded. For example, command 1 is processed by Command Consumer B and Command Producer B before command 2, even though command 1 corresponds to a lower priority message than command 2. The target time in command 1 provides an absolute urgency for the next processing step (e.g., Step B).

The prioritization rules can be easily tuned by, for example, changing the values in table 200. Thus, if there is expected to be a flood of high priority messages, the table 200 can be configured to further delay lower priority messages at each step.

It can be further noted that, in this example, each command includes a target time based on the priority information extracted from the input message to which the command corresponds. For example, each of commands 1 and 5 include target times determined based on the priority information from message 1001, each of commands 2 and 6 include target times determined based on the priority information from message 1002 and each of commands 3 and 4 include target times determined from the priority information extracted from message 1003.

While in the example of FIG. 3, all the command producers apply the same prioritization rule, in other embodiments, command producers 312 may each apply different prioritization rules (e.g., apply different functions, access different lookup tables or otherwise apply different rules). Furthermore, as described above, the prioritization rules may account for multiple variables or incorporate machine learning.

Figure 4:
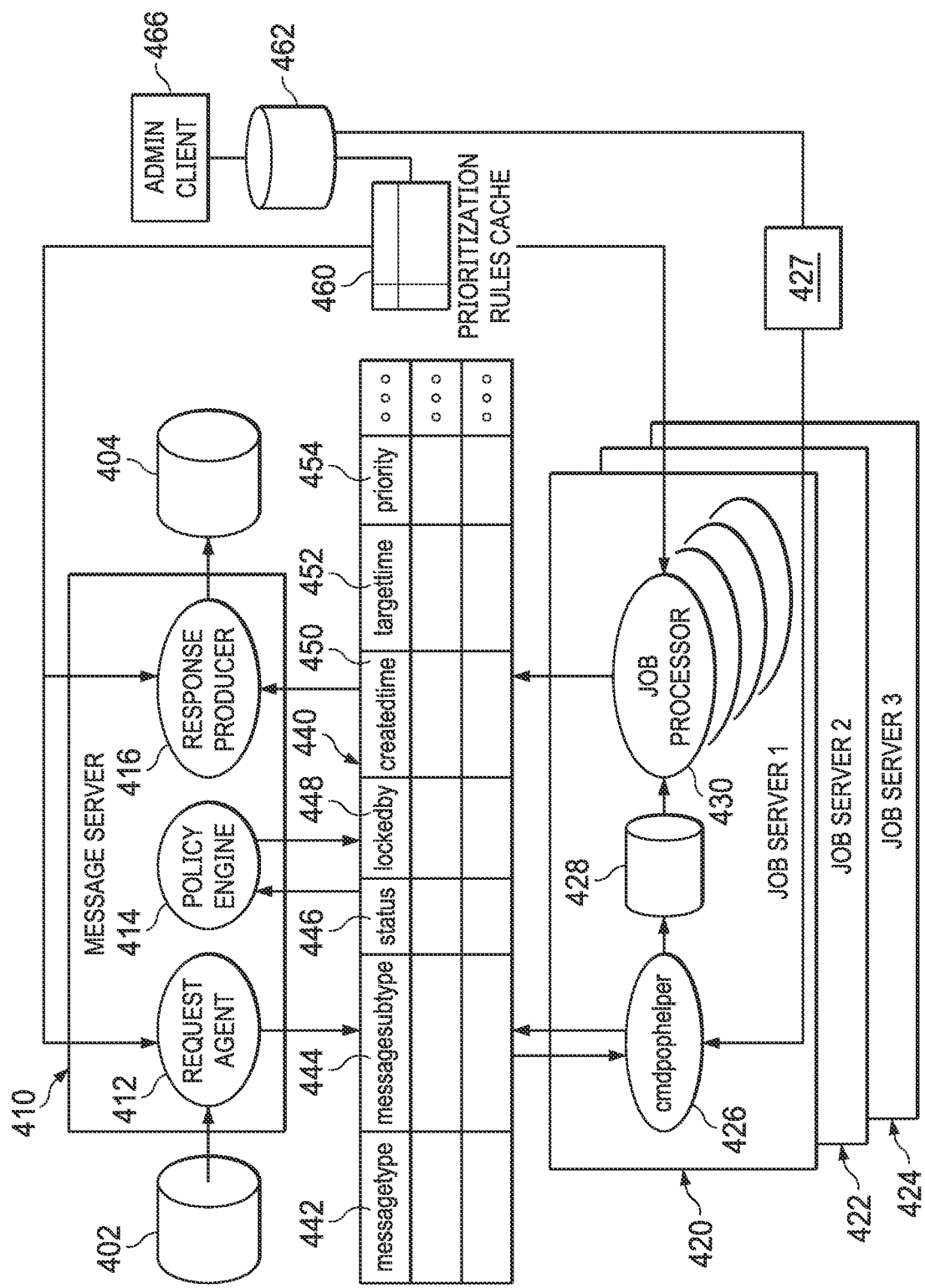
FIG. 4 is a diagrammatic representation of one embodiment of a system for processing requests.

A message processing system according to the teachings herein, such as message processing system 110, 310 may be implemented in a wide variety of systems to prioritize processing of a message through multiple processing steps. FIG. 4 is a diagrammatic representation of one embodiment of a system 400 for processing requests to perform jobs. System 400 includes a message server 410 that receives JMS requests to process jobs (JMS messages containing requests) and outputs JMS responses. As an example, system 400 may be an application system that processes requests to translate documents between electronic formats used by various entities and a request may be a JMS message that includes, for example, an indication of a sender, an indication of a recipient, and a location in a database, file system or other data store of a document to translate. In this example, a JMS response may be a JMS message that includes data indicating a location in a database, file system or other data store of the translated document and other data related to a request.

System 400 comprises a message server process (message server) 410 and a plurality of job processing server processes (job servers) 420, 422, 424 coupled to an input message queue 402 and an output message queue 404. Message server 410 and job servers 420, 422 and 424 may be distributed, for example, in a cloud computing environment. In one embodiment, message server 410 and job servers 420, 422, 424 may be implemented in different virtual machines.

Message server 410 is coupled to an input message queue 402 and output message queue 404. Input message queue 402 and output message queue are staging areas that contain messages waiting to be read by message consumers. Input message queue 402 and output message queue 404 may reside in volatile memory, persistent storage or a combination thereof. According to one embodiment, input message queue 402 and output message queue 404 are persisted in a database.

Message server 410 communicates commands to job servers 420, 422, 424 using command queue 416, which is a staging area holding commands waiting to be read by command consumers. Command queue 440 may reside in volatile memory, persistent storage (e.g., a database or other data store) or a combination thereof.

In the embodiment illustrated, each command in command queue 440 includes a message type 442, a message subtype 444, a status 446, a lock status 448, a created time 450, a target time 452, a priority 454 and other command content. The message type 442 and message subtype 444 are used internally by command consumers to select commands. Thus, to direct a command to a particular consumer, a producer can set the message type 442 and message subtype 444 accordingly. Status 446 may be any status that is to be passed to the message consumer. Locked status 448 indicates whether a message consumer has picked up the command from command queue 440. Created time 450 indicates the time the command was created. Target time 452 indicates an earliest time that the next command consumer should pick up the command from queue 440.

Message server 410 comprises a request ingest agent thread (request agent 412), a policy engine thread (policy engine 414) and a response producer thread (response producer 416). Request agent 412 comprises a message input consumer that applies selection criteria to select input messages from input queue 402. According to one embodiment, request agent comprises a JMS selector configured to select messages based on selection criteria including, but not limited to, the priority level 0-9 indicated in the JMSPriority field of the messages. Message server 410 may include multiple request agents 412, each configured to select input messages based on selection criteria. For example, one request agent 412 may be configured to select messages having priorities 0-7 and another request agent to select input messages having priorities 8-9.

Request agent 412 comprises a command producer (e.g., a command producer 112) and processes an input message (a request) to generate a corresponding command that can be consumed by a subsequent command consumer. The command includes data corresponding to the message, such as data extracted from the corresponding message or data obtained or produced by request agent 412 based on the corresponding message. According to one embodiment, the command can be assigned a message type and subtype so that it will be picked up by policy engine 414. The command further includes a target time determined for the command and the priority information from the corresponding request (e.g., JMSPriority field value, SLO or other priority information). The additional command content of the command may include data related to a job, such as pointers to data about the sender, receiver and document to be translated.

Policy engine 414 comprises a command consumer and a command producer. Policy engine 414 is configured to scan command queue 440 for commands with expired target times, that are not locked by a consumer and have a first combination of message type and subtype. According to one embodiment, policy engine 414 queries command queue 440 for a list of candidate commands that have expired target times and are not locked by a consumer. Policy engine 414 may group the candidate commands by message and message subtype and identify the consumable commands that meet the selection criteria of policy engine 414 (e.g., for example, the commands that have a first combination of message type and subtype). Policy engine 414 selects consumable commands meeting the selection criteria of policy engine 414 from command queue 440 and processes the selected commands to generate next commands corresponding to the input messages. For example, policy engine may use the information in a command corresponding to an input message to look up policy information based on the sender and receiver indicated in the input message and, based on the policy information, determine a job server 420, 422, 424 to process the job indicated in the corresponding input message.

Policy engine 414 may produce a command corresponding to the input message based on the policy information. As part of processing a selected command corresponding to an input message to produce a next command corresponding to the input message, policy engine 414 can apply prioritization rules to the priority information in the selected command to determine a target time for the next command. Further, in producing a next command corresponding to an input message, policy engine 414 can set the message type and subtype so that the command is picked up by the appropriate job server 420, 422, 424. The next command corresponding to an input message can be sent to command queue 440 and include the combination of message type and subtype determined by the policy engine, target time determined for the command and priority information for the command (e.g., JMSPriority field value, SLO or other priority information from the corresponding input message) along with other information.

Response producer 416 comprises a command consumer and a message producer (e.g., message producer 115). Response producer 416 is configured to watch command queue 440 for commands with expired target times, that are not locked by another consumer and have a second combination of message type and subtype. According to one embodiment, response producer queries command queue 440 for a list of candidate commands that have expired target times and are not locked by a consumer. Response producer 416 may group the candidate commands by message and message subtype and identify the commands that meet the selection criteria of response producer 416 (e.g., for example, the commands that have a second combination of message type and subtype). Response producer 416 selects commands meeting the selection criteria of response producer 416 from command queue 440 and processes the selected commands to generate response messages corresponding to the input messages. For example, response producer 416 may use the information in a command corresponding to an input message to generate an output message that points to the results of a processing job. The output message can be output to output message queue 404 where it can be picked up by another component.

Job server 420, job server 422 and job server 424 perform a bulk of the job processing. For example job server 420 may be configured to perform a first type translation, job server 422 may be configured to perform a second type of translation and job server 424 may be configured to perform a third type of translation. Job server 420 comprises a cmdpophelper thread 426, a local queue and a thread pool 430 of job processor threads. Job server 422 and job server 424 may implement a similar series of threads, but are configured to consume different commands than job server 420 and perform different translations.

Cmdpophelper thread 426 comprises a command consumer configured to select commands from command queue 440 based on message type and subtype. More particularly, cmdpophelper thread 426 queries command queue 440 for a list of candidate commands that have expired target times and are not locked by a consumer. Cmdpophelper thread 426 may group the candidate commands by message and message subtype and identify the commands that meet the selection criteria of cmdpophelper thread 426 (e.g., for example, the commands that have a third combination of message type and subtype). Cmdpophelper thread 426 is further configured to determine a runtime demand. For example, cmdpophelper thread 426 may access configuration information 427 that specifies how many job process threads are in thread pool 430. Based on the number of available threads in thread pool 430, cmdpophelper thread 426 selects a number of consumable commands to consume and locks the commands in command queue 440. As there may be multiple instances of job server 1 (job server 420) running, locking a command prevents the command from being picked up by another job sever.

Prior to selecting commands to consume, cmdpophelper 426 may time order the commands (e.g., from youngest to oldest target date) and order the commands based on secondary factors (e.g., priority). Cmdpophelper thread 426 can then select the commands to consume in order from the top of the ordered list.

Cmdpophelper thread 426 may process consumed commands. According to one embodiment, for example, cmdpophelper 426 may use the information in a command read from queue 440 to gather job data (e.g., all the data needed by a job process thread to process a job). For example, cmdpophelper thread 426 may access a document to be translated and other data needed to perform a translation and pass the document and other data to a local queue 428 (e.g., a FIFO queue of a thread pool manager) where the job data can be picked up by any job processor thread in thread pool 430. The job data corresponding to a consumed command may include the priority information from the command and, hence, the priority information from a corresponding input message.

The job processor threads of thread pool 430 are configured to carry out the primary job processing tasks, such as translating a document from one electronic format to another based on a set of job data read from local queue 428. Each job processor thread can include a command producer that produces commands corresponding to completed jobs and having a message type and subtype combination so that the commands will be picked up by response producer 416. As part of producing a command, a job processor thread uses the priority information passed with the job data to determine a target time for the command in order to control when the command will be processed by response producer 416.

Each job server 422 and 424 may include similar processing steps as job server 420, but have cmdpophelper threads that watch for different commands than cmdpophelper thread 426 and job processor threads that perform different types translations than job processor threads of thread pool 430.

Each command producer (e.g., request agent 412, policy engine 414 and job processor thread in thread pool 430) applies a prioritization rule to the message priority information or command priority information from a prior command to generate a target time 452 for the command being produced and includes the target time 452 and command priority information 454 as part of the command sent to queue 440. According to one embodiment, the command producers access prioritization rules data from a prioritization rules cache 460 to apply the prioritization rule. Prioritization rules cache 460 may reside in volatile memory, persistent memory or a combination thereof.

The prioritization rules data may specify a function on priority information or provide values (e.g., variable values, coefficient values or other values) used when applying a prioritization rule. For example, a prioritization rule may comprise any function to convert priority information to a time value, for example, an absolute time value. Several nonlimiting examples of prioritization rules, functions or data that may be applied by command producers of system 400 as discussed above in conjunction with FIG. 1.

System 400 further comprises an admin component 466 that provides an interface (e.g., web-based interface, command line interface or other interface) that allows a user at a client computer to configure prioritization rules, selection criteria and other aspects of system 400. Configuration data can be stored in a configuration database or other configuration data store 462. At least some of the configuration data may be pushed to cache. For example, prioritization rules data, such as a prioritization function definition, can be stored in a prioritization rules cache 460 for access by command producers and consumer configuration data 427 can be stored in a consumer configuration cache for use by consumers.

The embodiment of FIG. 4 is provided as just one example of a system that can implement producer-side prioritization of message processing. Embodiments of producer-side prioritization of processing may be implemented in a wide variety of systems to control processing based on priority.

Figure 5:
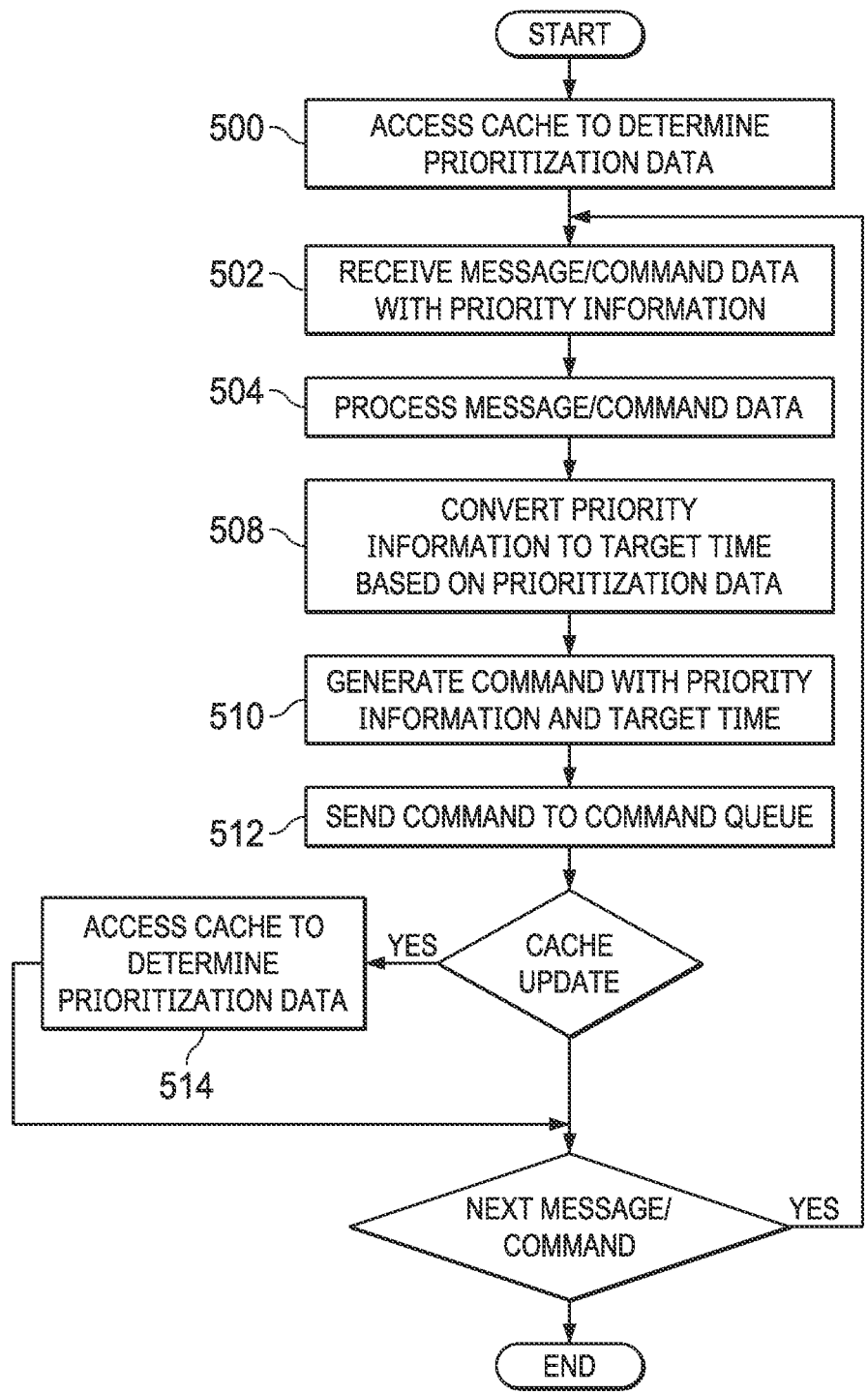
FIG. 5 is a flow chart illustrating one embodiment of a method for a command producer.

FIG. 5 is a flow chart illustrating one embodiment of a method that may be performed by each command producer, such as command producers 112, 312, request agent 412, policy engine 414, job processor threads of thread queue 430 or other command producers. At step 500, a command producer can access a prioritization rules cache (e.g., cache 130, 460) to determine the prioritization function or data to apply when producing commands corresponding to input messages.

At step 502, the command producer receives a first set of data corresponding to a message, including priority information for the message. The command producer may receive a set of data corresponding to the message by consuming a message or a command that corresponds to a message. In other embodiments, the command producer may receive the data corresponding to the message using other mechanisms, such as data passed by a thread to the command producer via a local queue in a process. According to one embodiment, the command producer comprises a consumer that includes a selector configured to select messages from a message queue (e.g., messages having particular priorities) commands from a command queue. In another embodiment, the command producer receives the data corresponding to a message from a consumer via a local process queue or other mechanism.

The command producer, at step 504, may process a first set of data to obtain or produce additional data corresponding to the message. The processing of the set of data corresponding to the message is dependent on the application system in which the command producer is implemented.

At step 508, the command producer, using the prioritization rules data, converts the priority information corresponding to the message to a target time for a command corresponding to the message. The command can be a command for a next processing step in a processing flow. As one example, the command producer may comprise a prioritization function, such as target_time=current_time+delta_time, where delta_time is determined from a lookup based on priority level. In other embodiments, the prioritization function may be arbitrarily complex and involve multiple variables. For example, if the input message contains an SLO, the prioritization function may be target_time=current time+delta_time where delta time is based on a lookup by SLO and priority level. In another embodiment, the prioritization function may determine the time to add to the based on resource use; for example, target_time=current_time+SLO/x+delta_time$_{priority}$, where x has a value based on current resource utilization and delta_time$_{priority}$ is based on a lookup.

In yet another embodiment, the lookup may be based on a variety of data, where the delta_time values are determined for a combination of data based on machine learning. As another example, the prioritization rules data may contain a machine learning model comprising a reference set of feature vectors, each reference feature vector representing a class having an associated delta_time value. In such an embodiment, the command producer, at step 508, may determine an input feature vector from the set of data corresponding to the message and compare the input feature vector to the reference set of feature vectors representing the known classes to determine the reference feature vector that has the highest similarity to the input feature vector. Further, the command producer can add the delta_time value associated with the reference feature vector having the highest similarity to the input feature vector to the current time to determine the target time for the command.

At step 510 the command producer produces a command that includes the priority information and the target time. According to one embodiment, the command may be an object and producing the command may comprise writing the priority information and target time to fields of the object. At step 512, the command producer sends the command to a command queue.

The command producer may receive a signal indicating that the cache has been updated. If so, the command producer can access the cache to determine the new prioritization data for the command producer (step 514).

The steps of FIG. 5 are provided by way of example and may be performed in other orders. Moreover, steps may be repeated or omitted or additional steps added. For example, steps may be repeated for multiple messages/commands.

Figure 6:
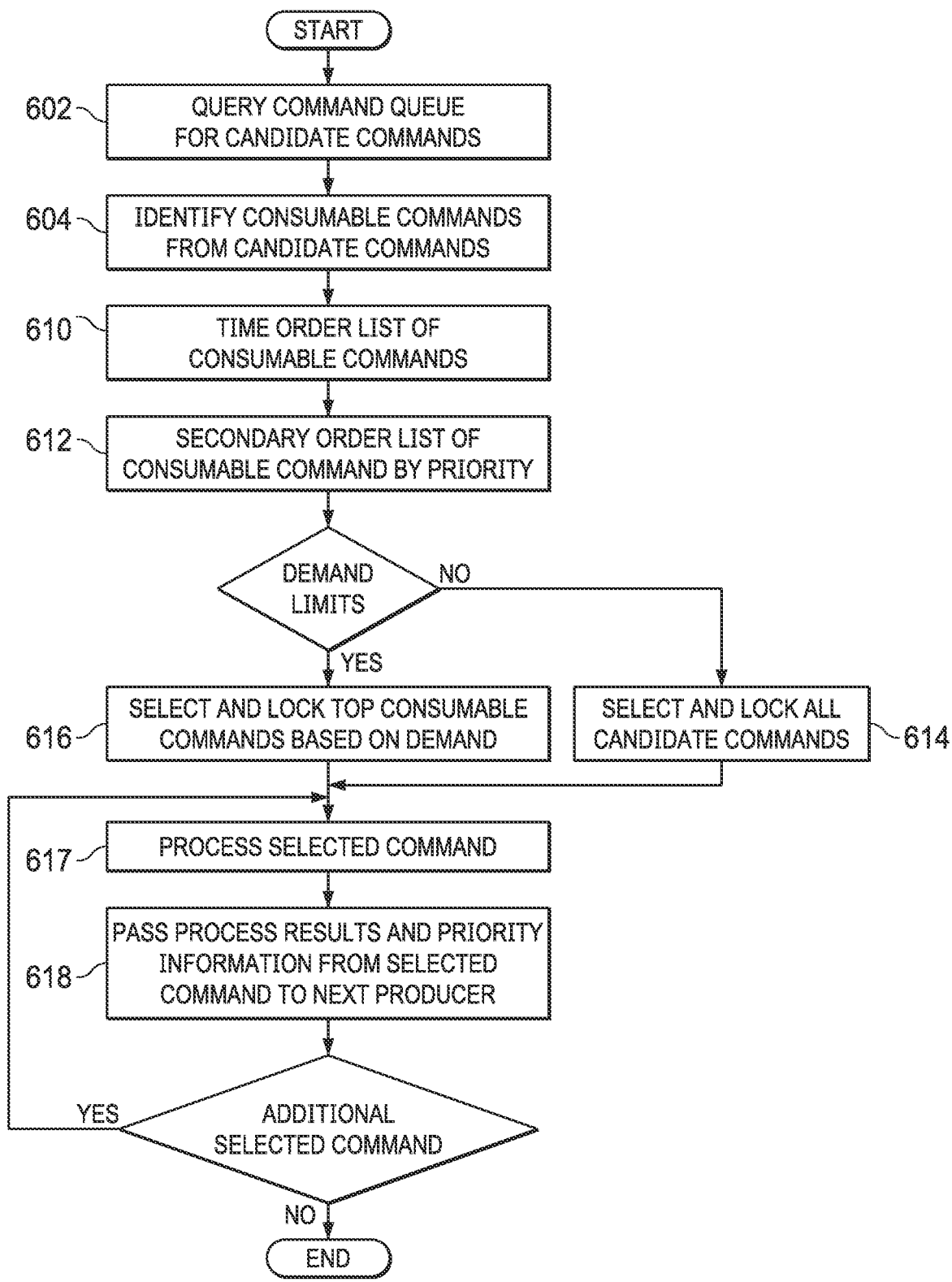
FIG. 6 is a flow chart illustrating one embodiment of a method for a command consumer.

FIG. 6 is a flow chart of one embodiment of a method that may be applied by a command consumer, such as command consumers 114, 314, policy engine 414, response producer 416, cmdpophelper 426 or other command consumer.

At step 602, the command consumer scans a command queue for candidate commands that have an expired target time. This may also include scanning the command queue for commands that have an expired target time and are not locked by a command consumer. In one embodiment, the command consumer scans the command queue by querying a database or cache holding the command queue for candidate commands.

At step 604, the command consumer may apply selection criteria to the candidate commands to identify consumable commands. For example, the command consumer may identify consumable commands having particular metadata values or commands meeting other criteria. In some embodiments, identifying the consumable commands may be implemented as part of scanning the command queue. For example, the command consumer may query a database for commands that meet particular criteria in addition to having an expired target time.

The command consumer can order the consumable commands based on target time from oldest to youngest (step 610). The command consumer may also perform a secondary ordering of the consumable commands based, for example, on priority information (step 612).

If the command consumer is not limited by demand as configured in the configuration information for the command consumer, the command consumer, at step 614, selects all the consumable commands identified in step 604. Selecting the consumable commands may include writing to the appropriate rows in the command queue to lock the commands.

If the command consumer is limited by demand as configured in the configuration information for the command consumer, the command consumer, at step 616, can execute a demand function to determine how many commands it can consume from the scan and select a subset of consumable candidate commands for consumption based on the demand function. For example, if there are four processing threads available to receive data from the command consumer (e.g., as specified in the consumer configuration information 140, 427), the command consumer may limit the commands it selects for consumption to a multiple of four as specified in the consumer configuration information and lock only that number of commands.

At step 617, the command consumer can process a selected consumable command. That is, the command consumer can consume and process the selected consumable command. The processing of a command can include processing a set of data corresponding to the message contained in the command to obtain or generate additional data corresponding to the message. The processing can depend on the application system in which the command producer is implemented. In any event, the command consumer can pass the results of processing a command to a next producer (command producer or message producer) along with the priority information from the command (step 618). In addition to the priority information, the data passed to the next producer can include data corresponding to an input message extracted from a command consumed by the command consumer or data obtained or produced by the command consumer based on a command consumed by the command consumer. Steps 617-618 can be repeated for each selected consumable command.

The steps of FIG. 6 are provided by way of example and may be performed in other orders. Moreover, steps may be repeated or omitted or additional steps added. According to one embodiment, the steps of FIG. 6 may be executed for each message or command in a set of commands.

FIG. 7 and FIG. 8 illustrate embodiments of operator interface pages that may be provided by an admin component (e.g., admin component 132, 466) to configure consumers and producers of an application system. Operator interface pages 700, 800 may be provided, for example, via a web interface.

Turning to FIG. 7, operator interface page 700 includes controls to allow a user to specify, for example, the polling frequency of an input message consumer (e.g., message consumer 111, request agent 412). The operator interface page 700 further controls to configure the message consumer to throttle the number of messages consumed per scan of the input message queue. In the example illustrated, the consumer is configured to scan an input message queue with a defined frequency and, if throttling is enabled, consume up to the defined number of messages (e.g., 30) per scan.

Operator interface 700 further provides controls to allow the user to input information for command producers (e.g., command producers 112, 312, request agent 412, policy engine 414, job processors in thread queue 430). In the embodiment illustrated, operator interface 700 includes a control that allows the user to specify a maximum delay time. This value can be used to limit selections in the operator interface of FIG. 8. A Producer Target Time Granularity control allows the user to specify the granularity of command target times generated by producers. A more granular target time can marginally increase storage and processing times, but reduces the likelihood that two commands will have the same target time.

Consumer configuration controls allow the user to configure command consumers (e.g., consumers 114, 314, policy engine 414, cmdpophelper 426, response producer 416). Consumer Selection Order control allows the user to configure ordering used by consumers to order candidate commands for selection (e.g., [target_time]; [priority]; [target_time, priority]; [priority, target_time]).

Operator interface 700 further provides controls to configure the demand function applied by consumers. For example, if the consumer is configured to apply the demand function, demand=m*threadpool_size, the user can set the value in In the example illustrated, the consumer will fetch up to 10× the threadpool_size in candidate commands.

Enable Command Throttling control allows the user to throttle various aspects of a message processing system. For example, Maximum Concurrent Threads allows the user to specify a maximum number of job processing threads in thread processing pool 430 can concurrently process commands based on the same policy (e.g., policy based on sender and receiver as determined by policy engine 414). This in turn can limit the number of commands for those threads that a command consumer will fetch per scan of the command queue. For example, if the maximum concurrent threads is 4, in the embodiment shown, the cmdpophelper(s) 426 of a throttled process will only fetch 40 commands per scan. As shown, the user may limit the throttling to selected processes (e.g., Job Server 1 and Job Server 2, but not Job Server 3). Throttling Delay allows the user to set an additional time delta that a command consumer of a throttled process will wait before selecting a command after the target time for the command has expired.

FIG. 8 illustrates an embodiment of an operator interface page 800 through which a user can specify prioritization data, such as variable, coefficient or other values for use when a producer applies a prioritization function. In the embodiment illustrated, the prioritization function applied by the command producers is target_time=current_time+delta_time and, thus, operator interface 800 allows the user to specify delta_times for the priority levels 0-9. The operator interface 800, however, can depend on the prioritization function applied.

In the example of FIG. 8 operator interface page 800 includes a Current Prioritization Data portion 802 and a Prioritization Template portion 804. Current Prioritization Data portion 802 shows the current prioritization rules data (e.g. the prioritization rules data in the prioritization rules cache 130, 460). In response to the user changing the value associated with a priority level in Current Prioritization Data portion 802, the admin component can push the updated prioritization rules data to cache for use by the producers.

Prioritization Template portion 804 allows a user to manage prioritization templates. A template is a named set of prioritization data that can be provided to command producers. Multiple templates may be stored in a template data store (e.g., data store 134, 462). For example, the user can add new templates or modify existing templates, remove templates or apply templates. For example, in FIG. 8, the user has selected the Template "Geometric" with the values illustrated. By selecting "Apply", the prioritization data from the "Geometric" template becomes the current prioritization data and is pushed to the prioritization data cache for immediate use by the command producers. However, any values in the template that exceed the maximum delay duration set in operator interface 700 can be limited to the maximum delay duration in the current prioritization rules data.

By using templates, an administrative user can easily change the prioritization data being used by a message processing system during execution. Furthermore, a template may be set as a default template to specify the prioritization data used when the message processing system starts.

Figure 9:
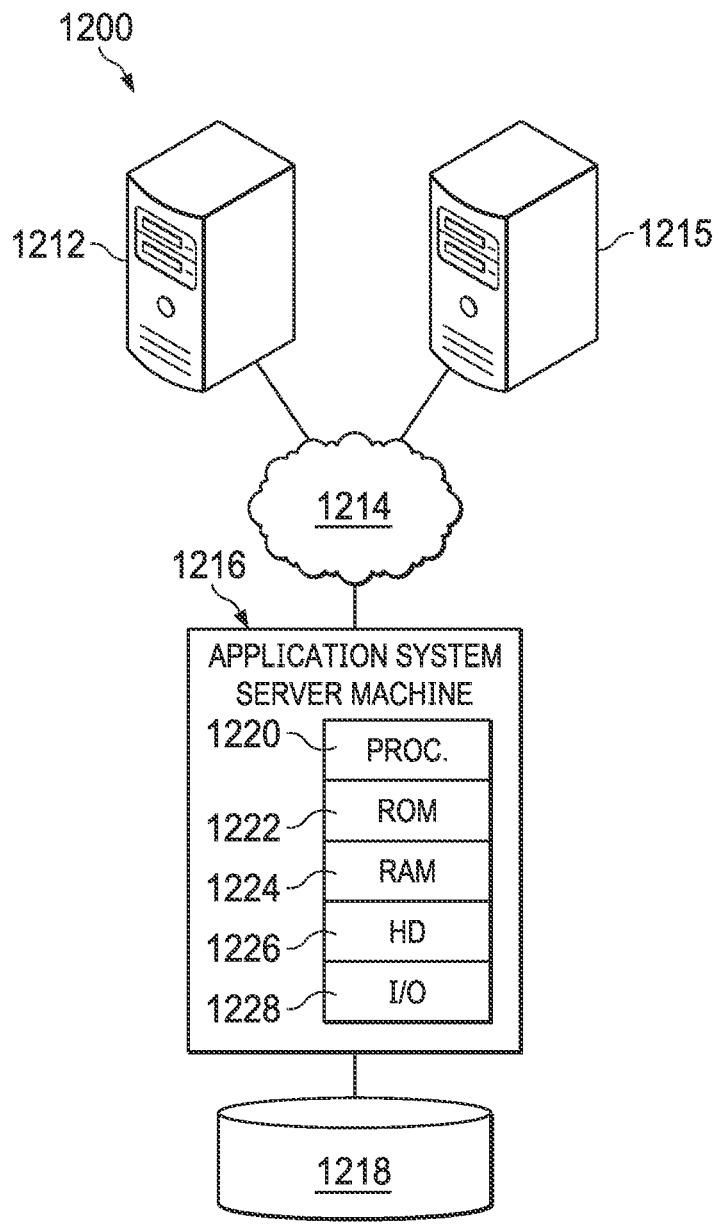
FIG. 9 is a diagrammatic representation of one embodiment of a computer system.

FIG. 9 is a diagrammatic representation of a distributed network computing environment 1200 where embodiments disclosed can be implemented. In the example illustrated, network computing environment 1200 includes network 1214 that can be bi-directionally coupled to first enterprise computer 1212, second enterprise computer 1215 and an application system server computer 1216. Application system server computer 1216 can be bi-directionally coupled to a data store 1218. Network 1214 may represent a combination of wired and wireless networks that network computing environment 1200 may utilize for various types of network communications known to those skilled in the art.

For the purpose of illustration, a single system is shown for each of first enterprise computer 1212, second enterprise computer 1215 and application system server computer 1216. However, with each of first enterprise computer 1212, second enterprise computer 1215 and application system server computer 1216 may comprise a plurality of computers (not shown) interconnected to each other over network 1214. For example, a plurality of first enterprise computers 1212 and a plurality of second enterprise computers 1215 may be coupled to network 1214.

First enterprise computer 1212 and second enterprise computer may include software components configured to send messages to a message queue or read messages from a message queue. Application system server computer 1216 comprises an application system configured to ingest messages from components at first enterprise computer 1212 or second enterprise computer 1215 from input message queue, process the messages and place responses in a message queue. Application system server computer 1216 can implement producer-side prioritization of message processing.

Application system server computer 1216 can include a processor 1220, read-only memory ("ROM") 1222, random access memory ("RAM") 1224, hard drive ("HD") or storage memory 1226, and input/output device(s) ("I/O") 1228. Application system server computer 1216 may include one or more backend systems configured for providing a variety of services to first enterprise computers 1212 and second enterprise computer 1215 over network 1214. Application system server computer 1216 may utilize data stored in a data store 1218. Many other alternative configurations are possible and known to skilled artisans.

Each of first enterprise computer 1212, second enterprise computer 1215, application system server computer 1216 of FIG. 9 may have more than one processor, ROM, RAM, HD, I/O, or other hardware components. For the sake of brevity, application system server computer 1216 is illustrated as having one of each of the hardware components, even if more than one is used.

Portions of the methods described herein may be implemented in suitable software code that may reside within ROM; RAM; or HD. Application system server computer 1216 may include, for example, a set of computer instructions stored on a computer readable medium (e.g., RAM, HD, ROM or other computer readable medium) that are executable by processor 1220 to provide a message processing system, such as a message processing system 110, 310, 400 or other message processing system. In addition to those types of memories, the instructions in an embodiment disclosed herein may be contained on a data storage device with a different computer-readable storage medium. The instructions may be stored as software code elements on a data storage array, magnetic tape, floppy diskette, optical storage device, or other appropriate data processing system readable medium or storage device.

Embodiments of the message processing system may be implemented in a cloud computing environment. In some embodiments, a message processing system may be implemented in one or more virtual machines on a server computer.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments discussed herein can be implemented in suitable instructions that may reside on a non-transitory computer readable medium, hardware circuitry or the like, or any combination and that may be translatable by one or more server machines. ROM, RAM, and HD are computer memories for storing computer-executable instructions executable by a CPU or other processor or capable of being compiled or interpreted to be executable by the CPU or other processor. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

A "computer-readable medium" may be any medium that can contain or store a program for use by or in connection with the instruction execution system, apparatus, system or device. The computer readable medium can be, by way of example only but not by limitation, an electronic, magnetic, optical, electromagnetic, or semiconductor system, apparatus, system, device or computer memory. Such computer-readable medium shall generally be machine readable and include software programming or code. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise a non-transitory computer readable media storing computer instructions translatable by a processor in a computing environment.

A "processor," unless context dictates otherwise, includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer program product comprising a non-transitory, computer-readable medium storing a set of computer-executable instructions that, when executed by a computer system, cause the computer system to implement a processing flow for processing an input message to generate a result, the set of computer-executable instructions comprising instructions for:
   receiving the input message according to a messaging protocol for communicating between software components, the input message comprising message priority information for the input message;
   in a first thread, producing a command for a next step in the processing flow, the command corresponding to the input message and comprising:
      a time value for a target time determined using the message priority information from the input message; and
      command priority information;
   queuing the command in a command queue;
   in a second thread:
      selecting the command from the command queue based on a determination that the target time has expired; and
      extracting the command priority information from the command; and passing the command priority information to a subsequent thread in the processing flow; and
processing the command.

2. The computer program product of claim 1, wherein the set of computer-executable instructions further comprises instructions for providing a second queue, the second queue for queueing data for a thread pool, wherein passing the command priority information to the subsequent thread in the processing flow comprises passing the command priority information to the second queue.

3. The computer program product of claim 2, wherein the set of computer-executable instructions further comprises instructions for determining a maximum number of commands to select from the command queue, and wherein selecting the command from the command queue based on the determination that the target time has expired further comprises:
identifying candidate commands that have expired target times from the command queue;
ordering the candidate commands based on an ordering criterion; and
selecting at least a subset of the candidate commands from the command queue up to the maximum number of commands.

4. The computer program product of claim 3, wherein the maximum number of commands is based on a size of the thread pool.

5. The computer program product of claim 2, wherein passing the command priority information to the second queue comprises passing job data for a job to the second queue, the job data including the command priority information and additional information for the job gathered based on the command.

6. The computer program product of claim 5, wherein the second thread passes the job data to the second queue.

7. The computer program product of claim 5, wherein the set of computer-executable instructions further comprises instructions for:
selecting the job data from the second queue using a thread from the thread pool and processing the job data to generate the result;
based on completing the job, producing a second command, the second command including a time value for a second target time, the second target time determined using the command priority information;
queuing the second command in the command queue;
in a fourth thread, selecting the second command from the command queue based on a determination that the second target time has expired; and
processing the second command to generate an output message, the output message pointing to the result.

8. The computer program product of claim 7, wherein the second command is produced using the thread from the thread pool.

9. The computer program product of claim 1, wherein producing the command comprises:
determining a time delta associated with the message priority information from the input message to which the command corresponds; and
adding the time delta associated with the message priority information to a current time to determine the target time to include in the command.

10. The computer program product of claim 1, wherein the command comprises a time stamp encoding the time value for the target time.

11. A computer-implemented method for producer-side prioritization in a processing flow:

receiving an input message according to a messaging protocol for communicating between software components, the input message comprising message priority information for the input message;
in a first thread, producing a command corresponding to the input message, the command comprising:
a time value for a target time determined using the message priority information from the input message; and
command priority information;
queuing the command in a command queue;
in a second thread;
selecting the command from the command queue based on a determination that the target time has expired; and
passing the command priority information to a subsequent thread in the processing flow; and
processing the command.

12. The computer-implemented method of claim 11, wherein passing the command priority information to the subsequent thread in the processing flow comprises passing the command priority information to a second queue, the second queue used to queue data for a thread pool.

13. The computer-implemented method of claim 12, further comprising determining a maximum number of commands to select from the command queue, wherein selecting the command from the command queue based on the determination that the target time has expired further comprises:
identifying candidate commands that have expired target times from the command queue;
ordering the candidate commands based on an ordering criterion; and
selecting at least a subset of the candidate commands from the command queue up to the maximum number of commands.

14. The computer-implemented method of claim 13, wherein the maximum number of commands is based on a size of the thread pool.

15. The computer-implemented method of claim 12, wherein passing the command priority information to the second queue comprises passing job data for a job to the second queue, the job data including the command priority information and additional information for the job gathered based on the command.

16. The computer-implemented method of claim 15, wherein the second thread passes the job data to the second queue.

17. The computer-implemented method of claim 15, further comprising:
selecting the job data from the second queue using a thread from the thread pool and processing the job data to generate a result;
based on completing the job, producing a second command, the second command including a time value for a second target time, the second target time determined using the command priority information;
queuing the second command in the command queue;
in a fourth thread, selecting the second command from the command queue based on a determination that the second target time has expired; and
processing the second command to generate an output message, the output message pointing to the result.

18. The computer-implemented method of claim 17, wherein the second command is produced using the thread from the thread pool.

19. The computer-implemented method of claim 11, wherein producing the command comprises:

determining a time delta associated with the message priority information from the input message to which the command corresponds; and adding the time delta associated with the message priority information to a current time to determine the target time to include in the command.

20. The computer-implemented method of claim 11, wherein the command comprises a time stamp encoding the time value for the target time.

* * * * *